Aug. 9, 1966               W. E. CURRIE            3,265,413
FLARED TUBE COUPLING JOINT AND METHOD
FOR MAKING THE SAME
Filed July 25, 1963

INVENTOR.
WILLIAM E. CURRIE

BY John N. Wolfram
ATTORNEY

United States Patent Office 3,265,413
Patented August 9, 1966

3,265,413
FLARED TUBE COUPLING JOINT AND METHOD FOR MAKING THE SAME
William E. Currie, Cleveland Heights, Ohio, assignor to Parker-Hannifin Corporation, Cleveland, Ohio, a corporation of Ohio
Filed July 25, 1963, Ser. No. 297,644
1 Claim. (Cl. 285—334.4)

This invention relates to flared tube coupling joints and more particularly to the shape of the flare on the tube and to the method of making the flare.

In flared tube coupling joints, the flared end of the tube is usually clamped between coupling members with the inner surface of the flare in sealing contact with a generally conical seating surface on one of the coupling members. In order to have a leak proof joint, the inner surface of the flare must engage the conical seating surface along a continuous circular line or area. The usual practice is to form the flare with an inner conical face which is substantially at the same angle as the conical seat of the coupling body and to depend upon yieldability of either the flare or the coupling seat to bring about continuous sealing contact in the event either the flare of body seat are slightly out of round or otherwise slightly imperfect. This is quite readily accomplished when either the tube or coupling material is soft enough to yield and deform when reasonable clamping force is applied. However, a great deal of difficulty is experienced in overcoming such defects when hard materials, such as stainless steel, are employed for both the tube and coupling, or when the wall thickness of the tube is relatively thick.

The present invention overcomes this problem by forming the inner surface of the tube flare with a raised annular portion which is formed in such a manner that it is circular to a high degree of accuracy and is adapted to engage the conical seat of the coupling with initial line contact which may be widened with moderate clamping pressure for adapting itself to slight out of roundness or other defects in the flare or coupling seat.

It is thus an object to provide a flared tube coupling joint which is particularly useful for making a leak proof joint when the materials of the tube and couplings are relatively hard.

It is another object of the invention to provide a flared tube coupling joint in which the inner face of the tube flare is formed with a raised annular portion for making substantially line contact with the coupling seat.

It is another object of the invention to provide a method of forming a flare on a tube with the inner face of the flare having a raised annular portion which is circular to a high degree of accuracy.

Figure 1:
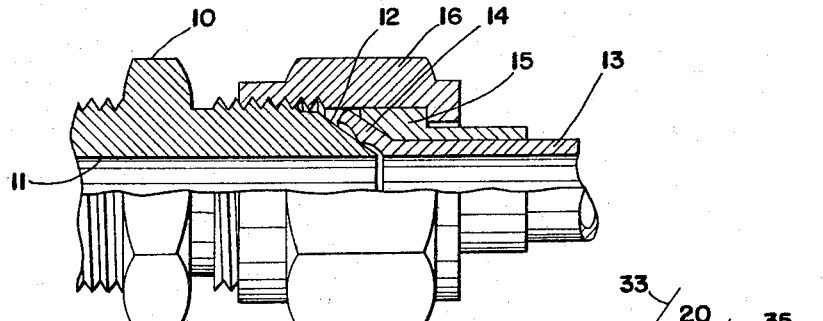
Figure 3:
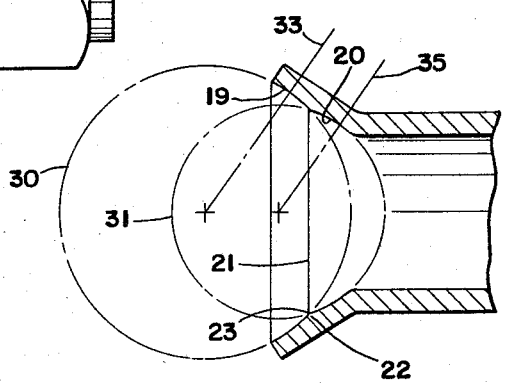
Figure 2:
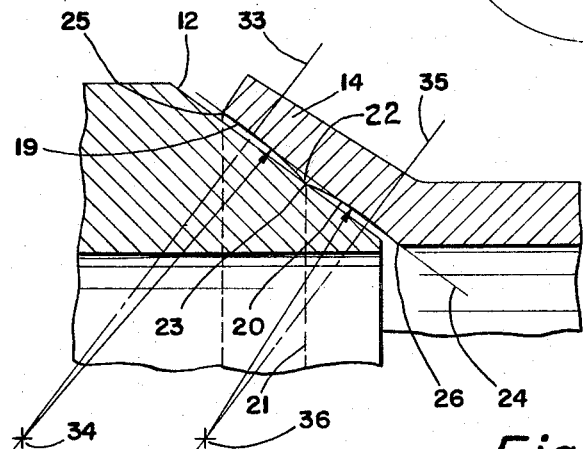
Figure 4:
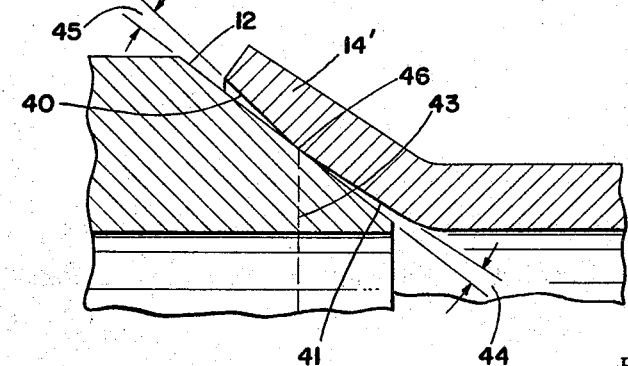

Other objects of the invention will be apparent from the following description and from the drawings in which:

FIG. 1 is a view partly in cross section showing a tube coupling joint in accordance with the present invention, FIG. 2 is an enlarged fragmentary view showing the shaping of the inner face of the tube flare, FIG. 3 is an enlarged cross section view through the flared end of the tube illustrating the method of forming the inner flare face, and FIG. 4 illustrates a modification of the invention.

The tube coupling joint includes a body member 10 having a fluid passage 11 therethrough and formed with a conical seat 12 at one end thereof. Tube 13 has a flared end 14 which is clamped against body seat 12 by a sleeve 15 and a nut 16, the latter having threaded engagement with body 10. Body seat 12 is preferably at an angle of about 37 degrees with the longitudinal axis of the body, but may be at any desired angle.

As best shown in FIGURE 2, the flared end 14 of the tube has its inner face formed with two concave spherical portions 19, 20 which intersect at a circular line 21, such intersection providing a raised annular portion 22 which projects beyond the general conical plane of the inner flare face. Stated in another way, the high point 23 of the raised annular portion in any radial cross section projects beyond a line drawn between any two points of the inner flare face on opposite sides of point 23, one such line being indicated at 24. Line 24, when drawn through points 25, 26 of surfaces 19 and 20 which are furthermost away from point 23, is preferably parallel with seat 12 so that all points of spherical surfaces 19, 20 will be spaced from seat 12 when the points on circular line 21 make initial contact with seat 12.

Surfaces 19 and 20 are formed to a high degree of accuracy in sphericity so that circular line 21 is also circular to a high degree of accuracy. As a result, when flare 14 is moved against the seat 12, the completeness with which raised annular portion 22 initially contacts seat 12 will depend almost entirely upon the circular accuracy with which seat 12 is formed. Since seat 12 is an external surface usually formed by a turning operation on a machine tool, it is quite readily formed with considerable accuracy so that raised annular portion 22 will engage the same throughout substantially its entire periphery without distortion of the seat or flare. Any portion of raised annular portion 22 which is not in intimate contact with seat 12 may be readily brought into such contact by clamping action of the nut and sleeve 15, 16 since the parts of portion 22 which are in initial contact will flatten readily to bring about complete circular contact. However, because of the large included angle between surfaces 19, 20 on either side of line 21, the area of contact between the annular raised portion 22 and the body seat 12 increases quite rapidly as the raised portion flattens to quickly increase the resistance to further flattening.

In the ideal condition, the inner flare face and body seat 12 are formed with sufficient accuracy so that when raised portion 22 has been sufficiently flattened for establishing complete sealing contact with seat 12, all other points of flare surfaces 19, 20 remain out of contact with the body seat. This is desirable so that raised annular portion 22 will continue to project from the inner flare surface so as to be the point of initial contact with body seat 12 on repeat make-ups of the coupling or upon substitution of a different body member 10. However, points 25, 26 may be brought into contact with seat 12 to resist excessive flattening or deformation of annular raised portion 22 when excessive tightening torque is applied to nut 16.

The sperical surfaces 19, 20 may be conveniently made to the high degree of accuracy which is desired by first forming the flare 14 in a conventional flaring tool having a conical punch, as for example, the flaring tool illustrated in Patent No. 2,089,133, and then lapping the inner face with two balls of different diameters. Thus, as illustrated in FIGURE 3, a ball 30 having a diameter slightly larger than the diameter of the outer end of the inner flare face is used for forming spherical surface portion 19 and a ball 31 having a diameter slightly larger than the desired diameter of annular raised portion 22 is used for forming spherical surface 20.

With ball diameters selected as indicated, it will be noted that a line 33 normal to conical seat 12 and passing through the center of sphericity 34 of surface 19 will intersect surface 19 between points 23 and 25. Similarly, a line 35 normal to the angle of seat 12 and passing through center of sphericity 36 of surface 20 will intersect the latter surface between points 23 and 26.

In the modification of the invention shown in FIGURE 4, the inner surface of flare 14¹ is formed with two conical portions 40, 41 of different angularity and which intersect on a circular line 43 to form a raised annular portion 46. The difference in angularity 44 between portion 41 and body seat 12 is preferably the same as the difference in angularity 45 between portion 40 and seat 12 and may be on the order of five degrees. Surfaces 40, 41 may be formed with a single double angle flaring tool punch, or may be formed with different punches in two operations, or lapped or machined to shape after conventional single angle flaring.

Still other modifications may be made within the scope of the invention as defined by the claims.

I claim:

A tube coupling assembly comprising a body member having a conical seat, a tube having a flared end with a radially outer face and a radially inner face, said radially inner face having first and second surface portions that intersect in a circular line, said surface portions being shaped so that said inner face makes initial contact with said conical seat at said circular line, a clamping member having an internal surface engageable with said radially outer face opposite said circular line, and means inter-engaged with said body member for forcing the clamping member against said outer face and said inner face at said circular line into sealing engagement with said conical seat, said surface portions being segments of spheres of different diameters.

References Cited by the Examiner

UNITED STATES PATENTS

| | | | |
|---|---|---|---|
| 217,643 | 7/1879 | Schmidt | 285—354 X |
| 511,937 | 1/1894 | Decarie | 285—334.2 |
| 1,896,261 | 2/1933 | True | 285—334.4 |
| 1,913,246 | 6/1933 | Saine | 285—334.4 |
| 2,704,678 | 3/1955 | Klein | 285—334.4 X |
| 2,863,678 | 12/1958 | Gordon | 285—334.4 X |

FOREIGN PATENTS

| | | |
|---|---|---|
| 1,141,975 | 3/1957 | France. |
| 836,901 | 6/1960 | Great Britain. |
| 405,281 | 8/1943 | Italy. |

CARL W. TOMLIN, *Primary Examiner.*